US011287972B1

(12) United States Patent
Bower, III et al.

(10) Patent No.: US 11,287,972 B1
(45) Date of Patent: Mar. 29, 2022

(54) SELECTABLE ELEMENT SELECTION WITHIN A CURVED DISPLAY EDGE

(71) Applicant: Motorola Mobility LLC, Chicago, IL (US)

(72) Inventors: Fred Allison Bower, III, Durham, NC (US); Amit Kumar Agrawal, Bangalore (IN); Olivier David Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/025,170

(22) Filed: Sep. 18, 2020

(51) Int. Cl.
*G06F 3/04886* (2022.01)
*G06F 3/041* (2006.01)

(52) U.S. Cl.
CPC ........ *G06F 3/04886* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 8,493,342 B2 | 7/2013 | Park et al. | |
| 8,769,431 B1 | 7/2014 | Prasad | |
| 8,924,894 B1 | 12/2014 | Yaksick et al. | |
| 9,401,984 B1 | 7/2016 | Alameh et al. | |
| 9,851,883 B2 | 12/2017 | Terrero et al. | |
| 10,572,007 B2 | 2/2020 | Agarwal et al. | |
| 10,817,173 B2 | 10/2020 | DeBates et al. | |
| 10,831,318 B2 | 11/2020 | Liu et al. | |
| 2010/0117975 A1* | 5/2010 | Cho | G06F 1/1641 345/173 |
| 2011/0082620 A1* | 4/2011 | Small | B60K 37/06 701/31.4 |
| 2011/0117970 A1 | 5/2011 | Choi | |
| 2012/0075351 A1 | 3/2012 | Imai et al. | |
| 2013/0038564 A1 | 2/2013 | Ho | |
| 2013/0159931 A1 | 6/2013 | Lee et al. | |

(Continued)

OTHER PUBLICATIONS

"Non-Final Office Action", U.S. Appl. No. 16/903,717, dated Nov. 10, 2020, 11 pages.

(Continued)

*Primary Examiner* — Christopher R Lamb
(74) *Attorney, Agent, or Firm* — FIG. 1 Patents

(57) ABSTRACT

In aspects of selectable element selection within a curved display edge, a wireless device has a display screen with curved display edges to display a user interface that includes one or more selectable elements to initiate respective device application actions. The wireless device implements an input control module, which can detect that a selectable element of the user interface is displayed at least partially within a curved display edge of the display screen. The input control module can receive a touch input proximate the selectable element of the user interface, and determine that the touch input is received within an element selection distance threshold as an intended touch input to select the selectable element. The input control module can then initiate to activate a respective device application action based on the intended touch input being proximate the selectable element within the element selection distance threshold.

20 Claims, 6 Drawing Sheets

(56) References Cited

U.S. PATENT DOCUMENTS

| | | |
|---|---|---|
| 2013/0324093 A1 | 12/2013 | Santamaria et al. |
| 2013/0342672 A1 | 12/2013 | Gray et al. |
| 2015/0261376 A1 | 9/2015 | Kim et al. |
| 2015/0363086 A1 | 12/2015 | Uno |
| 2016/0062515 A1 | 3/2016 | Bae et al. |
| 2016/0110098 A1* | 4/2016 | Stewart ............... G06F 3/04886 345/173 |
| 2016/0291731 A1 | 10/2016 | Liu et al. |
| 2016/0313966 A1* | 10/2016 | Jeong ...................... G06F 1/165 |
| 2016/0320866 A1 | 11/2016 | Parham |
| 2016/0320966 A1* | 11/2016 | Ryu ......................... G06F 3/017 |
| 2017/0102872 A1 | 4/2017 | Kim et al. |
| 2017/0231148 A1 | 8/2017 | Miwa |
| 2017/0366555 A1 | 12/2017 | Matus |
| 2018/0242242 A1 | 8/2018 | Lee et al. |
| 2019/0018461 A1 | 1/2019 | DeBates et al. |
| 2019/0018588 A1 | 1/2019 | DeBates et al. |
| 2019/0020760 A1 | 1/2019 | DeBates et al. |
| 2019/0052744 A1 | 2/2019 | Jung et al. |
| 2019/0179487 A1 | 6/2019 | Kong et al. |
| 2021/0397264 A1 | 12/2021 | Aman et al. |
| 2022/0035412 A1 | 2/2022 | Agrawal et al. |
| 2022/0038572 A1 | 2/2022 | Agrawal et al. |

OTHER PUBLICATIONS

"Final Office Action", U.S. Appl. No. 16/903,717, dated Jun. 7, 2021, 13 pages.

"Non-Final Office Action", U.S. Appl. No. 17/002,027, dated Nov. 23, 2021, 13 pages.

"Non-Final Office Action", U.S. Appl. No. 16/944,007, dated Nov. 9, 2021, 15 pages.

"Non-Final Office Action", U.S. Appl. No. 17/025,131, dated Dec. 7, 2021, 20 pages.

Agrawal, Amit Kumar et al., "U.S. Application as Filed", U.S. Appl. No. 17/575,338, filed Jan. 13, 2022, 64 pages.

Bandameedipalli, Jyothsna et al., "U.S. Application as Filed", U.S. Appl. No. 17/575,356, filed Jan. 13, 2022, 63 pages.

\* cited by examiner

SELECTABLE ELEMENT SELECTION WITHIN A CURVED DISPLAY EDGE

BACKGROUND

Devices such as smart devices, mobile devices (e.g., cellular phones, tablet devices, smartphones), consumer electronics, and the like can be implemented with various display screen configurations. For example, a smartphone may be implemented with a display screen that is flat and encompasses most of one side of the device. More recently, some mobile devices are designed with a curved display screen that wraps around all or part of the vertical sides of a device. Generally, a curved display screen has a curved edge on both vertical sides of a device, and the curved edges can be used to display user interface content and other display screen content. While the curved edges of a curved display screen generally enhances the aesthetics of a device, the curved edges introduce various design and usability challenges, particularly for user interface selectable controls that may be displayed within the curved edges of the display. Notably, a user interface selectable control displayed within a curved edge of the display screen may not register a user touch input to select and initiate the selectable control.

Generally, mobile devices may operate in different modes with various user interfaces that include selectable controls, some of which may be displayed within the curved edges of a device display. For example, a mobile device can operate for typical use in a high-power mode when turned on, and a home screen user interface includes selectable controls, such as to initiate device applications. A mobile device may also be operational with a lock screen from which some device features can be activated, such as quick activation of the device camera, emergency call functions, a flashlight, and other lock screen features, even though general use of the device is locked. Additionally, a mobile device may operate in a low-power mode with an always-on-display (AoD) in which the device processor is typically powered-down and the device display is implemented for low-power usage. In any of these device operational modes, the user interface selectable controls displayed within a curved edge of a curved display screen may be difficult for a user to select or touch contact, particularly for selectable controls that are displayed over the curved transition from the flat display screen to the curved display edge of the display screen.

BRIEF DESCRIPTION OF THE DRAWINGS

Implementations of the techniques for selectable element selection within a curved display edge are described with reference to the following Figures. The same numbers may be used throughout to reference like features and components shown in the Figures.

DETAILED DESCRIPTION

Figure 1:
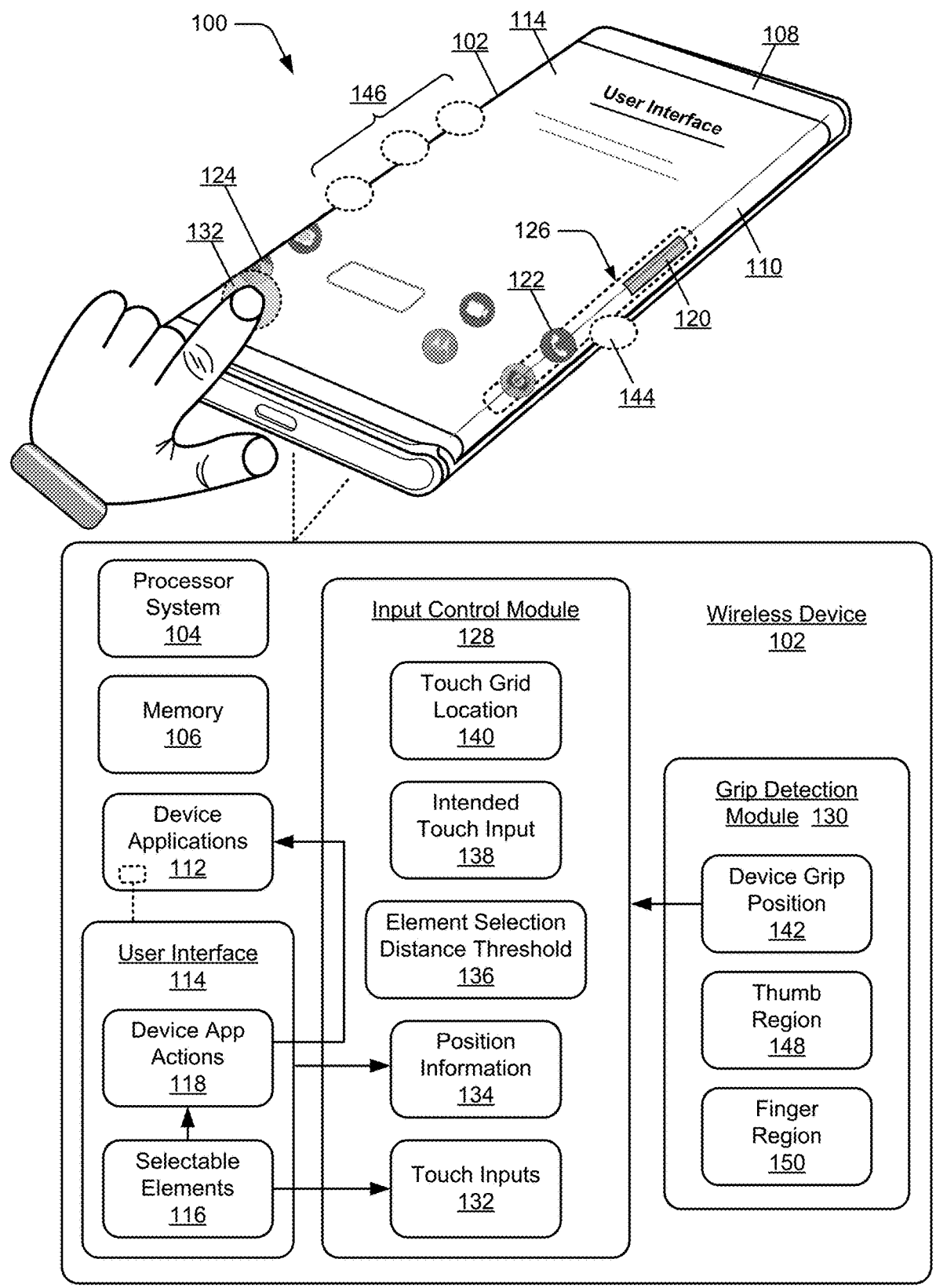
FIG. 1 illustrates an example of techniques for selectable element selection within a curved display edge using a wireless device in accordance with one or more implementations as described herein.

Implementations of selectable element selection within a curved display edge are described, and provide techniques that can be implemented by a wireless device, particularly for devices that display various user interfaces in different device modes, and for user interface selectable elements that are displayed within the curved display edges of a curved display screen. Notably, the user interface selectable controls that may be displayed within a curved edge of a curved display screen can be difficult for a user to select or touch contact, particularly for selectable controls that are displayed over the curved transition region from the flat part of the display screen to the curved display edge of the display screen. In aspects of the described techniques, a touch input approximately near a selectable element displayed over the curved transition and/or within the curved display edges of a display screen can be determined as an intended selection of the selectable element, even though the user may not directly contact all, or even some, of the selectable element.

A wireless device can include many different types of device applications, many of which generate or have a user interface that displays on the display screen of the device, as well as a lock screen user interface that typically turns-on and displays when a device is moved or picked-up for use. An application user interface or lock screen user interface typically includes selectable elements displayed in the user interface, and a selectable element can be selected by a user of the device with a touch input to initiate a corresponding device application action. A mobile device may also be implemented to operate in in a low-power mode with an always-on-display (AoD) in which the device processor is typically powered-down and the device display is implemented for low-power usage. The AoD mode may be used to detect movement or an approaching user, and operate the device in either a locked or unlocked state.

Notably, selectable elements in a user interface may be displayed over the curved transition region that transitions from the flat part of the display screen to the curved display edge of the display screen. These selectable elements that are displayed over the curved transition and/or within the curved display edges of a display screen may be difficult for a user to select or touch contact to initiate the selectable elements. Accordingly, the techniques for selectable element selection within a curved display edge can be implemented to facilitate user selections of the selectable elements that are displayed in a user interface over the curved transition and/or in the curved display edges of the display screen. In implementations, a touch input can be received proximate a selectable element of a user interface, and a determination is made that the touch input is received as an intended touch input by the user to select the selectable element. Thus, the user may not directly contact all (or even some) of the selectable element to initiate the corresponding device application action.

In aspects of selectable element selection within a curved display edge, the wireless device has a curved display screen, which wraps around all or part of the vertical sides of the wireless device. The display screen can display a user interface, such as a device application user interface, a lock screen user interface, and/or an AoD mode user interface of the device that includes selectable elements, which are selectable to initiate respective device application actions. The wireless device implements an input control module that can receive a touch input proximate the selectable element of the user interface, and determine that the touch input is received within an element selection distance threshold as an intended touch input to select the selectable element. The input control module can then initiate to activate a respective device application action based on the intended touch input being proximate the selectable element within the element selection distance threshold.

While features and concepts of selectable element selection within a curved display edge can be implemented in any number of different devices, systems, environments, and/or configurations, implementations of selectable element selection within a curved display edge are described in the context of the following example devices, systems, and methods.

FIG. 1 illustrates an example 100 of techniques for selectable element selection within a curved display edge, such as implemented with a wireless device 102. In this example 100, the wireless device 102 may be any type of a mobile phone, flip phone, computing device, tablet device, and/or any other type of mobile device. Generally, the wireless device 102 may be any type of an electronic, computing, and/or communication device implemented with various components, such as a processor system 104 and memory 106, as well as any number and combination of different components as further described with reference to the example device shown in FIG. 6. For example, the wireless device 102 can include a power source to power the device, such as a rechargeable battery and/or any other type of active or passive power source that may be implemented in an electronic, computing, and/or communication device.

The wireless device 102 includes a display screen 108, which in this example 100, is a curved display that wraps around, or partially wraps, the vertical sides of the wireless device. Generally, the display screen 108 has the curved display edges 110 on both vertical sides of the wireless device, and the curved display edges can be utilized to display any type of user interface or other display screen content. It should be noted that the techniques described herein for selectable element selection within a curved display edge are also applicable for a wireless device that has a traditional, flat display screen. The wireless device 102 also includes device applications 112, such as a text application, email application, video service application, cellular communication application, music application, and/or any other of the many possible types of device applications. Many device applications 112 have an associated user interface that is generated and displayed for user interaction and viewing. Similarly, a lock screen user interface may be displayed on the display screen 108 of the wireless device. In this example 100, the display screen 108 of the wireless device 102 can display a user interface 114 that is associated with a device application 112, or as a lock screen user interface.

The user interface 114 of a lock screen or device application 112 may include one or more selectable elements 116, which are user selectable, such as with a touch input, press, hold, or tap to initiate corresponding device application actions 118. For example, the user interface 114 displayed on the display screen 108 may be associated with a music playback application (e.g., any type of a device application 112), and the user interface includes selectable elements 116, such as a selectable element 120 that a user can select to control some device application action, or other selectable elements 122, 124 that the user can select to initiate other device application actions. The user interface 114 includes the other various selectable elements 122, 124 that a user can select with a touch input to initiate respective device application actions, such as to initiate the device camera, make a call, start a meeting, and the like.

In this example 100, the selectable element 120 of the user interface 114 is displayed over the curved transition region 126 that transitions from the flat display screen to the curved display edge 110 of the display screen 108. Similarly, other selectable elements 122, 124 of the user interface 114 are displayed over the curved transition from the flat display screen to the curved display edges 110 of the display screen. These selectable elements 120-124 that are displayed over the curved transition and/or in the curved display edges 110 of the display screen 108 may be difficult for a user to select or touch contact to initiate the selectable elements.

In this example 100, the wireless device 102 implements a input control module 128 and a grip detection module 130, which can be implemented as separate modules that may include independent processing, memory, and/or logic components functioning as a computing and/or electronic device integrated with the wireless device 102. Alternatively or in addition, either of the modules can be implemented in software, in hardware, or as a combination of software and hardware components. In this example, the input control module 128 and the grip detection module 130 are implemented as software applications or modules, such as executable software instructions (e.g., computer-executable instructions) that are executable with a processor (e.g., with the processor system 104) of the wireless device 102 to implement the techniques and features of selectable element selection within a curved display edge, as described herein.

As software applications or modules, the input control module 128 and the grip detection module 130 can be stored on computer-readable storage memory (e.g., the memory 106 of the device), or in any other suitable memory device or electronic data storage implemented with the modules. Alternatively or in addition, the input control module 128 and/or the grip detection module 130 may be implemented in firmware and/or at least partially in computer hardware. For example, at least part of the modules may be executable by a computer processor, and/or at least part of the modules may be implemented in logic circuitry.

In implementations, the input control module 128 is implemented by the wireless device 102 to facilitate user selections of the selectable elements (e.g., selectable elements 122, 124) that are displayed in the user interface 114 over the curved transition and/or in the curved display edges 110 of the display screen 108, which may be difficult for a user to select or touch contact to initiate the selectable elements. As described in more detail below, the input control module 128 can receive a touch input 132 that is proximate a selectable element 124 of the user interface 114, and determine that the touch input is received as an intended touch input by the user to select the selectable element. Thus, the user may not directly contact all (or even some) of the selectable element 124 to initiate the corresponding device application action 118.

The input control module 128 can determine, or receive notification, that the user interface 114 corresponds to an active lock screen or a foreground active device application 112, which causes the selectable elements 116 of the user interface 114 to be active and selectable. Generally, as described with reference to the example device shown in FIG. 6, the wireless device 102 has an operating system with a system layer (e.g., kernel layer) that can determine a foreground active device application has selectable elements that overlap the curved transition and/or are displayed in the curved display edges 110 of the display screen 108 by analyzing a view structure of the device application. The system layer can also receive indications of touch input events on the user interface 114 at the device layer when a user of the wireless device attempts to activate a device application action 118 by selecting a corresponding selectable element 116. The input control module 128 can register as an application, at the application layer, with the system layer to receive indications, notifications, and/or communications as to the selectable elements 116 that are displayed in a user interface 114. The input control module 128 can also manage the touch inputs 132, which are registered with the input control module, such as a user input that is received on the user interface 114 as a press, hold, tap, touch, or similar type input.

In aspects of the techniques for selectable element selection within a curved display edge, as described herein, the input control module 128 can determine that the user interface 114 corresponds to a foreground active device application or lock screen, as well as receive position information 134 that indicates respective display locations of the selectable elements 120-124 in the user interface. As shown in the example 100, the input control module 128 can receive a touch input 132 proximate the selectable element 124 of the user interface 114, and determine that the touch input is received within an element selection distance threshold 136 as an intended touch input 138 to select the selectable element. Notably, the touch input 132 may be received on the flat surface of the display screen 108 proximate the selectable element 124 that is displayed at least partially within the curved display edge 110 of the display screen.

As noted above, the user may not directly contact all (or even some) of the selectable element, yet the input control module 128 can determine that the touch input is intended as a selection of the selectable element 124 if the touch input is received within the distance threshold 136, or within some other designated distance, from the selectable element as indicated by the display location of the selectable element 124 from the position information 134. In an implementation, the input control module 128 may also receive the touch input 132 proximate the selectable element 124 and snap the touch input as a touch selection on the selectable element to activate the respective device application action 118. The input control module 128 can then initiate to activate the corresponding device application action 118 based on the intended touch input 138 being proximate the selectable element 124 within the element selection distance threshold 136.

Figure 2:
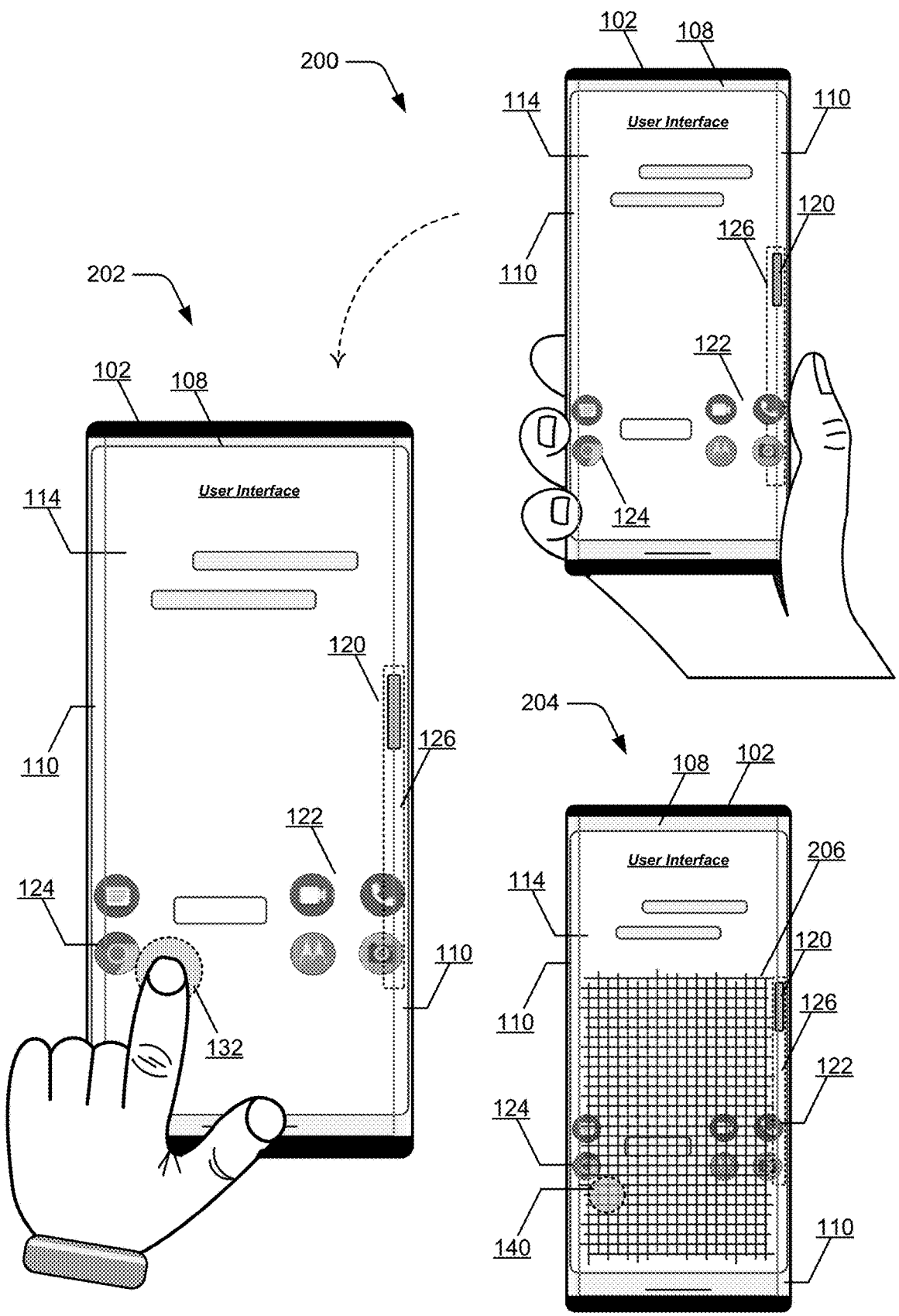
FIG. 2 illustrates examples of features for selectable element selection within a curved display edge using a wireless device in accordance with one or more implementations as described herein.

FIG. 2 further illustrates examples 200 of aspects and features for selectable element selection within a curved display edge, as described herein, such as using the wireless device 102 as shown and described with reference to FIG. 1. As shown in the example 200, the display screen 108 of the wireless device 102 can display the user interface 114 that is associated with a device application 112, and the user interface includes the selectable elements 120-124 that are associated with respective device application actions 118. For example, the selectable element 120 of the user interface 114 is displayed over the curved transition region 126 that transitions from the flat part of the display screen 108 to the curved display edge 110 of the display screen. Similarly, the other selectable elements 122, 124 of the user interface 114 are displayed over the curved transition from the flat part of the display screen 108 to the curved display edges 110 of the display screen. These selectable elements 120-124 that are displayed over the curved transition and/or within the curved display edges 110 of the display screen 108 may be difficult for a user to select or touch contact to initiate the selectable elements.

As described above, the input control module 128 can determine that the user interface 114 is the active foreground display (e.g., the active user interface), as well as receive the position information 132 that indicates respective display locations of the selectable elements 120, 122 in the user interface. As shown at 202, a user may attempt a selection of the selectable element 124 with a touch input 132 on the user interface 114 that is displayed on the display screen 108 of the wireless device 102. The user may not directly contact all (or even some) of the selectable element that displays over the curved transition region of the display screen 108, yet the input control module 128 can determine that the touch input 132 is intended as a selection of the selectable element 124 if the touch input is received within the element selection distance threshold 136, or within some other designated distance, from the selectable element as indicated by the display location of the selectable element 124 from the position information 134.

As further shown at 204, the input control module 128 may utilize a touch grid 206 as a way of determining whether a touch input in the user interface 114 on the display screen 108 is likely an intended touch input selection of a selectable element. In practice, the touch grid 206 would not be displayed in the user interface or on the display screen, but rather is shown merely for a discussion example. In implementations, the input control module 128 can receive the touch input 132 on the "underlying" touch grid 206 and determine that the touch input is an intended touch input 138 to select the selectable element 124 based on a touch grid location 140 of the touch input inferred to activate the respective device application action 118. The input control module 128 can be implemented to translate the touch grid location 140 to a shift of x-number of millimeters, or other measurable offset distance from a displayed selectable element 124 in the touch grid 206, and determine that the touch input 132 on the display screen 108 is an intended touch input selection of the selectable element 124.

The input control module 128 can also use the touch grid 206, along with the received position information 134 that indicates where the selectable elements 120-124 are displayed in the user interface 114, to detect whether an additional selectable element is displayed proximate the selectable element which the user has selected, or has intended to select. The input control module 128 can then determine that the touch input 132 is the intended touch input 138 to select the selectable element 124 and not select the additional selectable element that may be displayed near the selectable element that the user has intended to select.

Returning to the discussion of FIG. 1, and in other aspects of the described features for selectable element selection within a curved display edge, the input control module 128 may also receive indications of false rejects associated with the touch inputs 132 on a selectable element 120-124 of the user interface 114 that is displayed within a curved display edge 110 of the display screen 108, where the false rejects indicate that a device application action 118 is not initiating responsive to the touch inputs. The false rejects can occur when a user of the wireless device 102 intends to initiate a device application action 118, but due to the display position of the selectable element 116 in the curved transition region 126 and/or within a curved display edge 110 of the display screen 108, the touch inputs 132 on the selectable element are not recognized to initiate the corresponding device application action. Typically, a user will attempt multiple touch inputs 132 on the selectable element 116 when the device application action 118 fails to initiate or activate. In implementations, the input control module 128 can determine the proximate distance to recognize a touch input as an intended selection of a selectable element based on multiple received touch inputs 132 determined as intended touch inputs to select the selectable element. Accordingly, the input control module 128 can also adjust the element selection distance threshold 136 based on the determined proximate distance of the intended touch inputs.

The grip detection module 130 is implemented by the wireless device 102 to detect the device grip position 142 of a user grip holding the wireless device. A representation of a user grip holding the device is generally shown as a thumb position 144 on one vertical side of the wireless device 102, and finger positions 146 on the other vertical side of the device, as if a user were holding the device with his or her right hand. Typically, a user grips and holds a device with his or her thumb on one side, and two or three fingers on the other side of the device, and the device also likely contacts or rests in some portion of the user's palm of his or her hand. The thumb position 144, the finger positions 146, and/or the user's palm of his or her hand also likely contact some areas of the curved display edges 110 of the display screen 108 and/or contact the display screen in the various regions that include the displayed selectable elements.

The grip detection module 130 can also determine which hand, left or right, the user is using to hold the wireless device 102, as well as the vertical position along the vertical sides of the device. Notably, the grip detection module 130 can determine a thumb region 148 of the device grip position 142 on a first side of the wireless device, such as proximate the thumb position 144. The grip detection module 130 can also determine a finger region 150 of the device grip position 142 on a second side of the wireless device, such as proximate the finger positions 146. In instances when a user changes hands and/or adjusts the grip position, the grip detection module 130 can detect a change in the device grip position 142 of the user grip holding the wireless device.

Example methods 300, 400, and 500 are described with reference to respective FIGS. 3, 4, and 5 in accordance with implementations of selectable element selection within a curved display edge. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
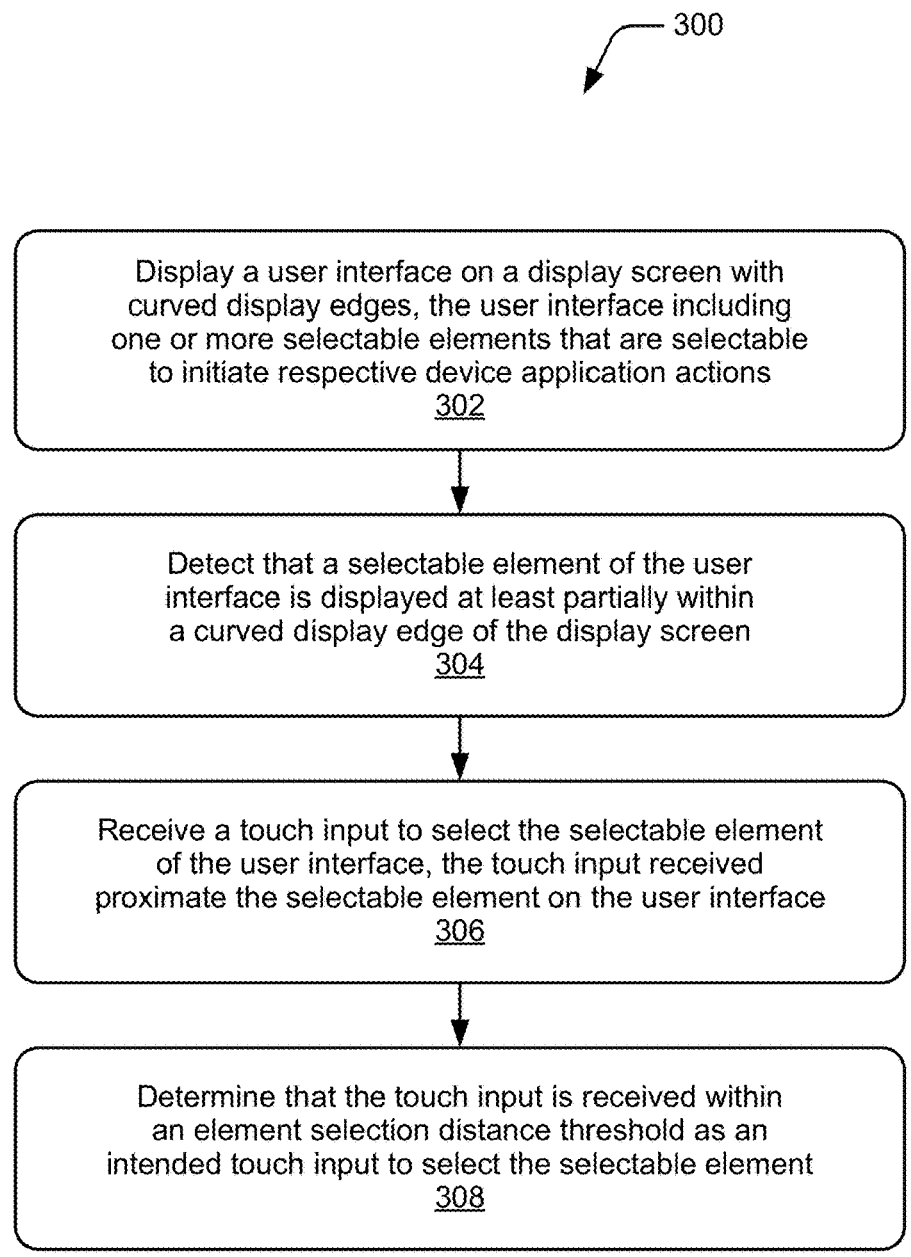
FIG. 3 illustrates an example method of selectable element selection within a curved display edge in accordance with one or more implementations of the techniques described herein.

FIG. 3 illustrates example method(s) 300 of selectable element selection within a curved display edge, and is generally described with reference to a wireless device, as well as an input control module implemented by the device. The order in which the method is described is not intended to be construed as a limitation, and any number or combination of the described method operations can be performed in any order to perform a method, or an alternate method.

At 302, a user interface is displayed on a display screen with curved display edges, the user interface including selectable elements that are selectable to initiate respective device application actions. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 304, a selectable element of the user interface is detected as being displayed at least partially within a curved display edge of the display screen. For example, the input control module 128 can detect that a selectable element 120-124 of the user interface 114 is displayed over the curved transition region 126 of the display screen 108, and/or displayed at least partially within a curved display edge 110 of the display screen. Alternatively or in addition, the input control module 128 can receive the position information 134 that indicates the respective display locations of the selectable elements 120-124 in the user interface.

At 306, a touch input is received to select the selectable element of the user interface, the touch input received proximate the selectable element on the user interface. For example, the input control module 128 can receive the touch input 132 proximate the selectable element 124 of the user interface 114, such as the touch input 132 may be received on the flat surface of the display screen 108 proximate the selectable element 124 that is displayed at least partially within the curved display edge 110 of the display screen. Additionally, the input control module 128 may utilize the touch grid 206 and register the touch input 132 on the touch grid of the display screen. In implementations, the input control module 128 can receive the touch input 132 proximate the selectable element 124 and snap the touch input as a touch selection on the selectable element to activate a respective device application action 118.

At 308, a determination is made that the touch input is received within an element selection distance threshold as an intended touch input to select the selectable element. For example, the input control module 128 can determine that the touch input 132 is received within an element selection distance threshold 136 as an intended touch input 138 to select the selectable element 124. The input control module 128 may also determine the intended touch input 138 as a selection of the selectable element 124 based on a touch grid location 140 of the touch input on the touch grid 206 inferred to activate a respective device application action 118. Alternatively or in addition, the input control module may determine the intended touch input 138 based on the selectable element being active and selectable, and based on the touch input being proximate a display location of the selectable element, as determined from the received position information 134 that indicates the respective display locations of the selectable elements 120-124 in the user interface.

Figure 4:
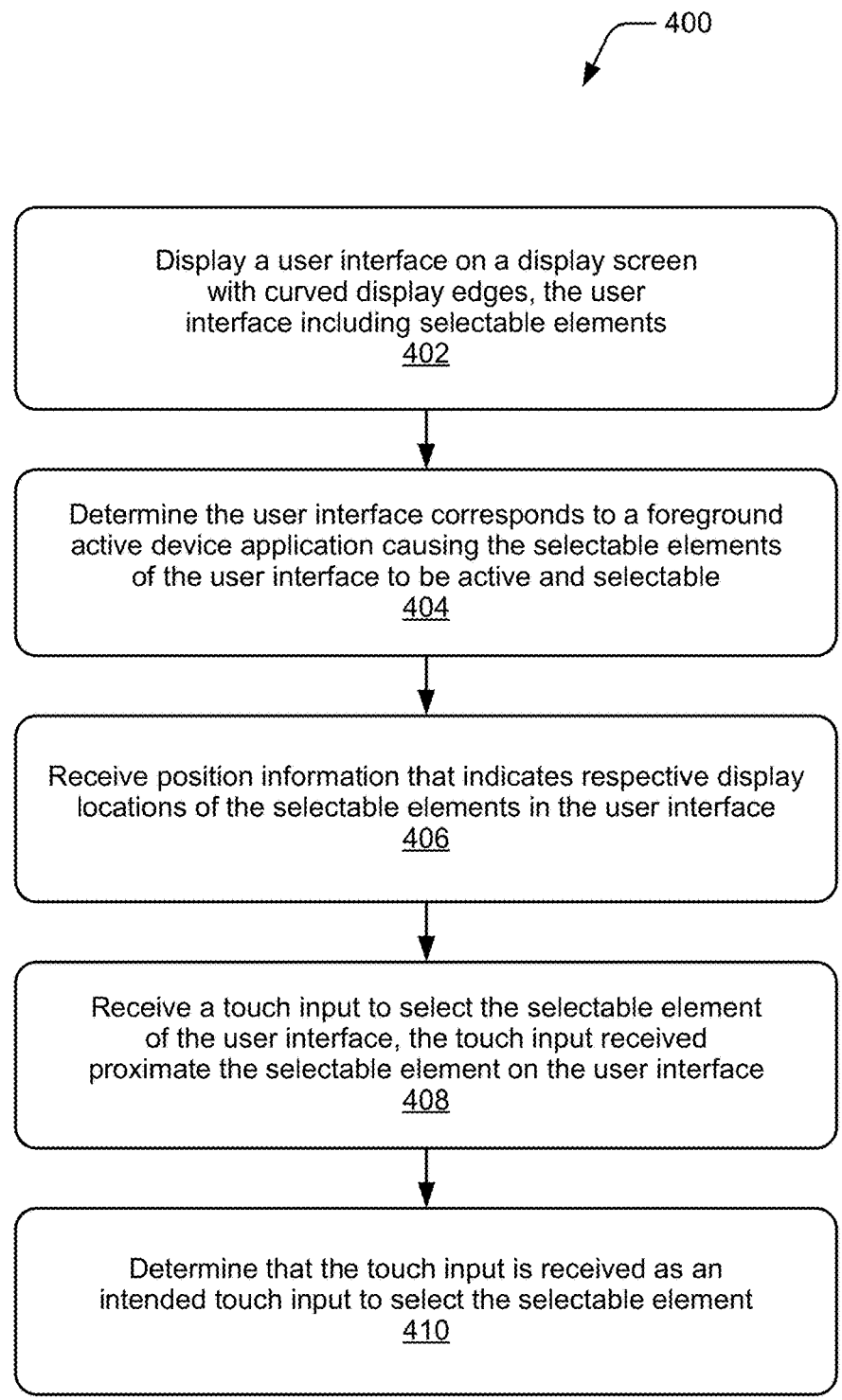
FIG. 4 illustrates another example method of selectable element selection within a curved display edge in accordance with one or more implementations of the techniques described herein.

FIG. 4 illustrates example method(s) 400 of selectable element selection within a curved display edge, and is generally described with reference to a wireless device, as well as an input control module implemented by the device. The order in which the method is described is not intended to be construed as a limitation, and any number or combination of the described method operations can be performed in any order to perform a method, or an alternate method.

At 402, a user interface is displayed on a display screen with curved display edges, the user interface including selectable elements. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 404, a determination is made that the user interface corresponds to a foreground active device application causing the selectable elements of the user interface to be active and selectable. For example, the input control module 128 can determine, or receive notification, that the user interface 114 corresponds to an active lock screen or a foreground active device application 112, which causes the selectable elements 116 of the user interface 114 to be active and selectable.

At 406, position information is received that indicates respective display locations of the selectable elements in the user interface. For example, the input control module 128 can receive the position information 132 that indicates the respective display locations of the selectable elements 120-124 in the user interface 114 on the display screen 108. This may include the input control module 128 detecting, or receiving notification, that a selectable element of the user interface 114 is displayed at least partially within a curved display edge 110 of the display screen. In implementations, the input control module 128 can register as an application, at the application layer, with the system layer to receive indications, notifications, and/or communications as to the selectable elements 116 that are displayed in the user interface 114.

At 408, a touch input is received to select the selectable element of the user interface, the touch input received proximate the selectable element on the user interface. For example, the input control module 128 can receive the touch input 132 proximate the selectable element 124 of the user interface 114, such as the touch input 132 may be received on the flat surface of the display screen 108 proximate the selectable element 124 that is displayed at least partially within the curved display edge 110 of the display screen. Additionally, the input control module 128 may utilize the touch grid 206 and register the touch input 132 on the touch grid of the display screen.

At 410, a determination is made that the touch input is received as an intended touch input to select the selectable element. For example, the input control module 128 can determine that the touch input 132 is received as the intended touch input 138 to select the selectable element 124 based on the touch input being detected on the flat surface of the display screen 108 proximate the selectable element 124 that is displayed at least partially within the curved display edge 110 of the display screen. In implementations, the input control module 128 can also determine that the touch input 132 is received within an element selection distance threshold 136 as an intended touch input 138 to select the selectable element 124. The input control module 128 may also determine the intended touch input 138 as a selection of the selectable element 124 based on a touch grid location 140 of the touch input on the touch grid 206 inferred to activate a respective device application action 118.

Figure 5:
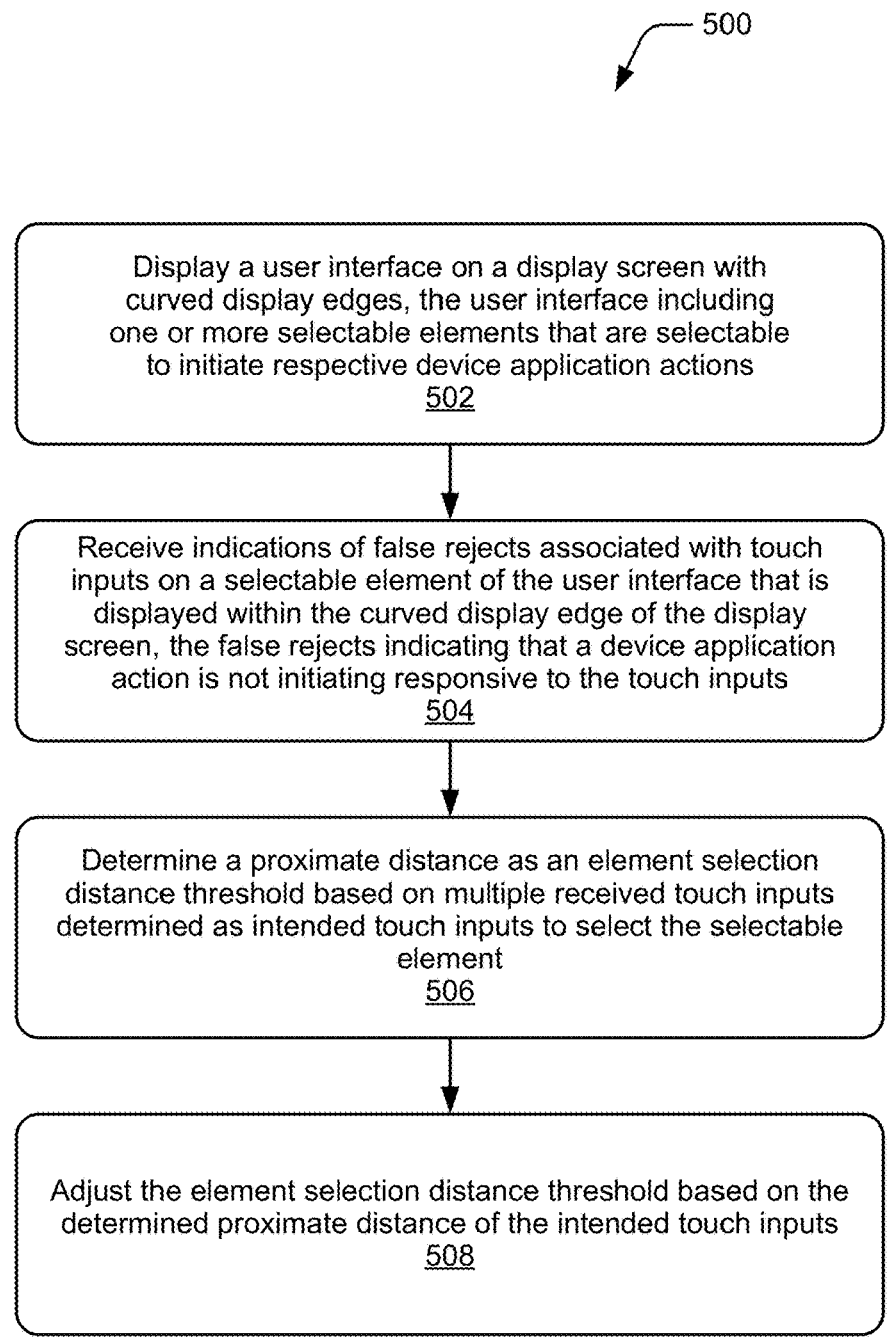
FIG. 5 illustrates another example method of selectable element selection within a curved display edge in accordance with one or more implementations of the techniques described herein.

FIG. 5 illustrates example method(s) 500 of selectable element selection within a curved display edge, and is generally described with reference to a wireless device, as well as an input control module implemented by the device. The order in which the method is described is not intended to be construed as a limitation, and any number or combination of the described method operations can be performed in any order to perform a method, or an alternate method.

At 502, a user interface is displayed on a display screen with curved display edges, the user interface including one or more selectable elements that are selectable to initiate respective device application actions. For example, the display screen 108 of the wireless device 102 displays the user interface 114 that is associated with a device application 112, or as a lock screen user interface. The user interface 114 of a lock screen or device application 112 may include one or more selectable elements 116, which are user selectable to initiate corresponding device application actions 118.

At 504, indications of false rejects are received, the false rejects associated with touch inputs on a selectable element of the user interface that is displayed within the curved display edge of the display screen, the false rejects indicating that a device application action is not initiating responsive to the touch inputs. For example, the input control module 128 can receive indications of false rejects associated with the touch inputs 132 on a selectable element 120-124 of the user interface 114 that is displayed within a curved display edge 110 of the display screen 108, where the false rejects indicate that a device application action is not initiating responsive to the touch inputs. The false rejects can occur when a user of the wireless device 102 intends to initiate a device application action 118, but due to the display position of the selectable element 116 in the curved transition region 126 and/or within a curved display edge 110 of the display screen 108, the touch inputs 132 on the selectable element are not recognized to initiate the corresponding device application action. Typically, a user will attempt multiple touch inputs 132 on the selectable element 116 when the device application action 118 fails to initiate or activate.

At 506, a proximate distance is determined as an element selection distance threshold based on multiple received touch inputs determined as intended touch inputs to select the selectable element. For example, the input control module 128 can determine the proximate distance to recognize a touch input 132 as an intended selection of a selectable element 124 based on multiple received touch inputs 132 determined as intended touch inputs to select the selectable element. In implementations, the input control module 128 can receive the touch inputs 132 proximate the selectable element 124 of the user interface 114, such as the touch inputs 132 may be received on the flat surface of the display screen 108 proximate the selectable element 124 that is displayed at least partially within the curved display edge 110 of the display screen. At 508, the element selection distance threshold is adjusted based on the determined proximate distance of the intended touch inputs. For example, the input control module 128 can adjust the element selection distance threshold 136 based on the determined proximate distance of the intended touch inputs 138.

Figure 6:
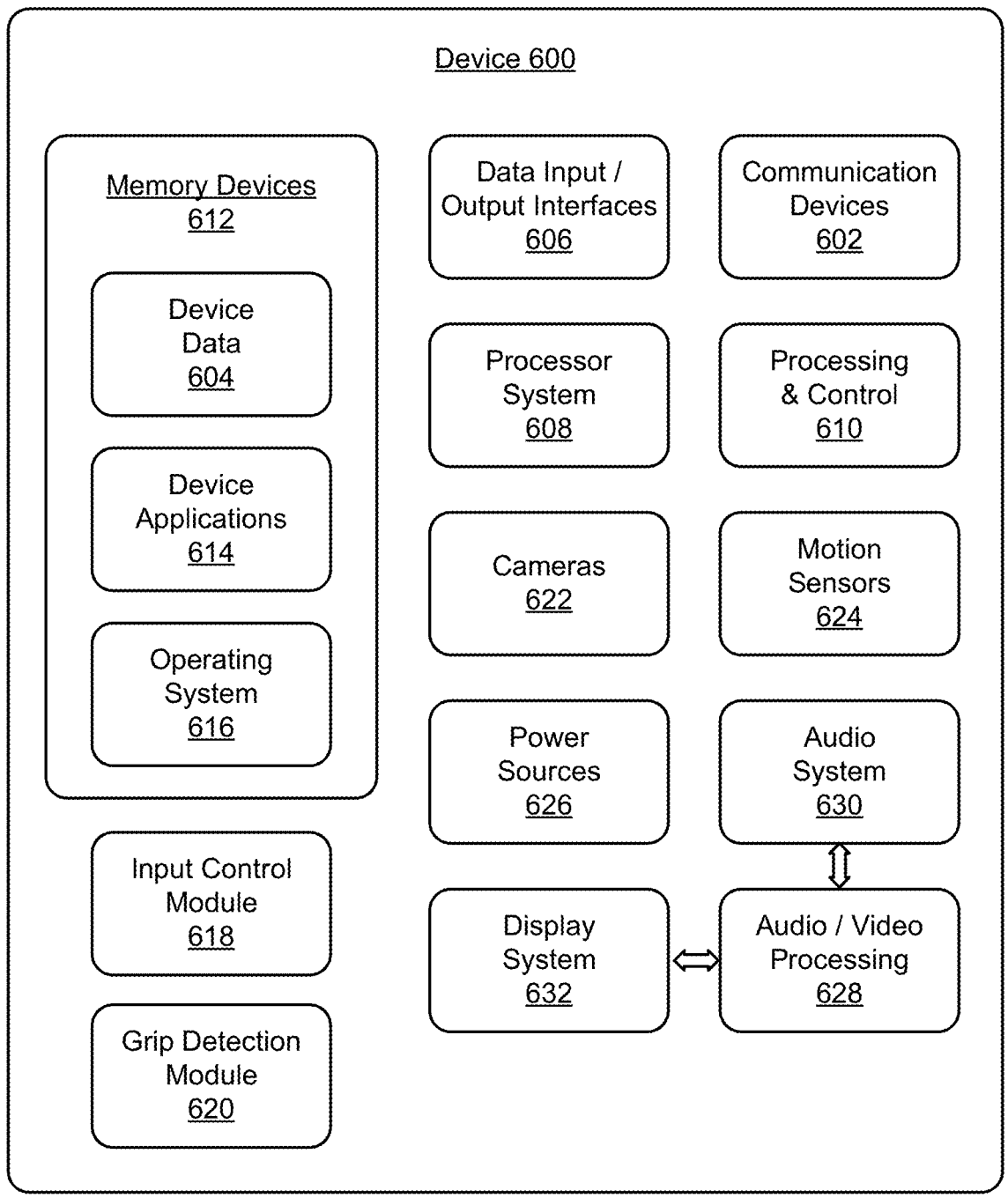
FIG. 6 illustrates various components of an example device that can be used to implement the techniques for selectable element selection within a curved display edge as described herein.

FIG. 6 illustrates various components of an example device 600, which can implement aspects of the techniques and features for selectable element selection within a curved display edge, as described herein. The example device 600 can be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or transferred from one computing device to another, and/or synched between multiple computing devices. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 can be used to couple the device to any type of components, peripherals, and/or accessory devices, such as a computer input device that may be integrated with the example device 600. The I/O interfaces 606 may also include data input ports via which any type of data, information, media content, communications, messages, and/or inputs can be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 can be maintained as software instructions with a memory device and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes an input control module 618 and a grip detection module 620 that implement various aspects of the described features and techniques for selectable element selection within a curved display edge. The modules may each be implemented with hardware components and/or in software as one of the device applications 614, such as when the example device 600 is implemented as the wireless device 102 described with reference to FIGS. 1-5. An example of the input control module 618 includes the input control module 128, and an example of the grip detection module 620 includes the grip detection module 130 that is implemented by the wireless device 102, such as software applications and/or as hardware components in the wireless device. In implementations, the input control module 618 and the grip detection module 620 may include independent processing, memory, and logic components as a computing and/or electronic device integrated with the example device 600.

The example device 600 can also include cameras 622 and/or motion sensors 624, such as may be implemented as components of an inertial measurement unit (IMU). The motion sensors 624 can be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations of selectable element selection within a curved display edge have been described in language specific to features and/or methods, the appended claims are not necessarily limited to the specific features or methods described. Rather, the specific features and methods are disclosed as example implementations of selectable element selection within a curved display edge, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: a display screen with curved display edges to display a user interface that includes one or more selectable elements to initiate respective device application actions; an input control module implemented at least partially in hardware and configured to: detect that a selectable element of the user interface is displayed at least partially within a curved display edge of the display screen; receive a touch input proximate the selectable element of the user interface; determine that the touch input is received within an element selection distance threshold as an intended touch input to select the selectable element; and initiate to activate a respective device application action based on the intended touch input being proximate the selectable element within the element selection distance threshold.

Alternatively or in addition to the above described wireless device, any one or combination of: the input control module is configured to receive the touch input on a flat surface of the display screen proximate the selectable element that is displayed at least partially within the curved display edge of the display screen. The input control module is configured to receive the touch input on a touch grid of the display screen, and determine that the touch input is the intended touch input to select the selectable element based on a touch grid location of the touch input inferred to activate the respective device application action. The input control module is configured to receive the touch input within a designated distance from the selectable element, and determine that the touch input is the intended touch input to select the selectable element based on the touch input being within the designated distance from the selectable element. The input control module is configured to receive the touch input proximate the selectable element and snap the touch input as a touch selection on the selectable element to activate the respective device application action. The input control module is configured to detect whether an additional selectable element of the user interface is displayed proximate the selectable element, and determine that the touch input is the intended touch input to select the selectable element and not select the additional selectable element. The input control module is configured to receive position information that indicates a display location of the selectable element in the user interface, and determine that the touch input is the intended touch input to select the selectable element based on the touch input being proximate the display location of the selectable element. The input control module is configured to determine proximate distance based on multiple received touch inputs determined as intended touch inputs to select the selectable element, and adjust the element selection distance threshold based on the determined proximate distance of the intended touch inputs. The input control module is configured to determine the user interface corresponds to a foreground active device application causing the selectable element of the user interface to be active and selectable, and determine that the touch input is the intended touch input to select the selectable element based on the selectable element being active and selectable.

A method, comprising: displaying a user interface on a display screen with curved display edges, the user interface including one or more selectable elements that are selectable to initiate respective device application actions; detecting that a selectable element of the user interface is displayed at least partially within a curved display edge of the display screen; receiving a touch input to select the selectable element of the user interface, the touch input received proximate the selectable element on the user interface; and determining that the touch input is received within an element selection distance threshold as an intended touch input to select the selectable element.

Alternatively or in addition to the above described method, any one or combination of: the receiving the touch input is on a flat surface of the display screen proximate the selectable element that is displayed at least partially within the curved display edge of the display screen. The receiving the touch input is on a touch grid of the display screen, and the determining the touch input is the intended touch input to select the selectable element is based on a touch grid location of the touch input inferred to activate a respective device application action. The receiving the touch input is proximate the selectable element and snapping the touch input as a touch selection on the selectable element to activate a respective device application action. The method further comprising receiving position information that indicates a display location of the selectable element in the user interface, and the determining the touch input is the intended touch input to select the selectable element based on the touch input being proximate the display location of the selectable element. The method further comprising determining proximate distance based on multiple received touch inputs determined as intended touch inputs to select the selectable element and adjusting the element selection distance threshold based on the determined proximate distance of the intended touch inputs. The method further comprising determining the user interface corresponds to a foreground active device application causing the selectable element of the user interface to be active and selectable, and wherein the determining the touch input is the intended touch input to select the selectable element is based on selectable element being active and selectable.

A method, comprising: displaying a user interface on a display screen with curved display edges, the user interface including one or more selectable elements; detecting that a selectable element of the user interface is displayed at least partially within a curved display edge of the display screen; receiving a touch input to select the selectable element of the user interface, the touch input received proximate the selectable element on the user interface; and determining that the touch input is received as an intended touch input to select the selectable element.

Alternatively or in addition to the above described method, any one or combination of: the determining that the touch input is received as the intended touch input to select the selectable element is based on the touch input being received within an element selection distance threshold. The determining that the touch input is received as the intended touch input to select the selectable element is based on the receiving the touch input is on a flat surface of the display screen proximate the selectable element that is displayed at least partially within the curved display edge of the display screen. The determining that the touch input is received as the intended touch input to select the selectable element is based on the receiving the touch input on a touch grid of the display screen, a touch grid location of the touch input inferred as the intended touch input proximate the selectable element.

The invention claimed is:

1. A wireless device, comprising:
a display screen with curved display edges to display a user interface that includes one or more selectable elements to initiate respective device application actions;
an input control module implemented at least partially in hardware and configured to:
  detect that a selectable element of the user interface is displayed at least partially within a curved display edge of the display screen;
  receive multiple touch inputs determined as intended touch inputs to select the selectable element, the multiple touch inputs being a proximate distance from the selectable element;
  adjust a designated distance offset from the selectable element based on the proximate distance of the multiple touch inputs from the selectable element;
  determine that a subsequent touch input is a selection of the selectable element based on the subsequent touch input being received within the designated distance offset as adjusted based on the proximate distance from the selectable element; and
  initiate to activate a respective device application action based on the subsequent touch input being proximate the selectable element within the designated distance offset from the selectable element.

2. The wireless device as recited in claim 1, wherein the input control module is configured to receive the subsequent touch input on a flat surface of the display screen proximate the selectable element that is displayed at least partially within the curved display edge of the display screen.

3. The wireless device as recited in claim 1, wherein the input control module is configured to:
  receive the subsequent touch input on a touch grid of the display screen; and
  determine that the subsequent touch input is the selection of the selectable element based on a touch grid location of the subsequent touch input inferred to activate the respective device application action.

4. The wireless device as recited in claim 1, wherein the input control module is configured to receive the subsequent touch input proximate the selectable element and snap the subsequent touch input as a touch selection on the selectable element to activate the respective device application action.

5. The wireless device as recited in claim 1, wherein the input control module is configured to:
  detect whether an additional selectable element of the user interface is displayed proximate the selectable element; and
  determine that the subsequent touch input is the selection of the selectable element and not a selection of the additional selectable element.

6. The wireless device as recited in claim 1, wherein the input control module is configured to:
  receive position information that indicates a display location of the selectable element in the user interface; and
  determine that the subsequent touch input is the selection of the selectable element based on the subsequent touch input being proximate the display location of the selectable element.

7. The wireless device as recited in claim 1, wherein to adjust the designated distance offset, the input control module is configured to increase the designated distance offset based on the proximate distance of the intended touch inputs.

8. The wireless device as recited in claim 1, wherein the input control module is configured to:
  determine the user interface corresponds to a foreground active device application causing the selectable element of the user interface to be active and selectable; and
  determine that the subsequent touch input is the selection of the selectable element based on the selectable element being active and selectable.

9. The wireless device as recited in claim 1, wherein the input control module is configured to receive the subsequent touch input as a stationary touch input.

10. The wireless device as recited in claim 1, wherein the input control module is configured to receive the intended touch inputs on the user interface outside an initial designated distance offset from the selectable element.

11. The wireless device as recited in claim 1, wherein the intended touch inputs are not recognized as selections of the selectable element to activate the respective device application action.

12. A method, comprising:
displaying a user interface on a display screen with curved display edges, the user interface including one or more selectable elements that are selectable to initiate respective device application actions;
detecting that a selectable element of the user interface is displayed at least partially within a curved display edge of the display screen;
receiving multiple touch inputs determined as intended touch inputs to select the selectable element, the multiple touch inputs being a proximate distance from the selectable element;
adjusting a designated distance offset from the selectable element based on the proximate distance of the multiple touch inputs from the selectable element; and
determining that a subsequent touch input is a selection of the selectable element based on the subsequent touch input being received within the designated distance offset as adjusted based on the proximate distance from the selectable element.

13. The method as recited in claim 12, wherein the subsequent touch input is received on a flat surface of the display screen proximate the selectable element that is displayed at least partially within the curved display edge of the display screen.

14. The method as recited in claim 12, wherein:
the subsequent touch input is received on a touch grid of the display screen; and
the determining the subsequent touch input is the selection of the selectable element is based on a touch grid location of the subsequent touch input inferred to activate a respective device application action.

15. The method as recited in claim 12, wherein the subsequent touch input is received proximate the selectable element and snapping the subsequent touch input as a touch selection on the selectable element to activate a respective device application action.

16. The method as recited in claim 12, further comprising:
receiving position information that indicates a display location of the selectable element in the user interface; and
the determining the subsequent touch input is the selection of the selectable element based on the subsequent touch input being proximate the display location of the selectable element.

17. The method as recited in claim 12, further comprising:
determining the user interface corresponds to a foreground active device application causing the selectable element of the user interface to be active and selectable; and
wherein the determining the subsequent touch input is the selection of the selectable element is based on the selectable element being active and selectable.

18. A method, comprising:
displaying a user interface on a display screen with curved display edges, the user interface including a selectable element that is displayed at least partially within a curved display edge of the display screen;
receiving multiple touch inputs determined as intended touch inputs to select the selectable element, the multiple touch inputs being outside of a designated distance offset to the selectable element and within a proximate distance from the selectable element;
adjusting the designated distance offset from the selectable element based on the proximate distance of the multiple touch inputs from the selectable element; and
determining that a subsequent touch input is received as a selection of the selectable element based on the subsequent touch input being received within the designated distance offset as adjusted based on the proximate distance from the selectable element.

19. The method as recited in claim 18, wherein the determining that the subsequent touch input is received as the selection of the selectable element is based on the subsequent touch input being received on a flat surface of the display screen proximate the selectable element that is displayed at least partially within the curved display edge of the display screen.

20. The method as recited in claim 18, wherein the determining that the subsequent touch input is received as the selection of the selectable element is based on the subsequent touch input being received on a touch grid of the display screen, a touch grid location of the subsequent touch input inferred as the selection of the selectable element.

* * * * *